United States Patent

Newberg et al.

[11] Patent Number: 5,786,646
[45] Date of Patent: Jul. 28, 1998

[54] METHOD AND APPARATUS FOR ALIGNING A ROTOR POSITION TRANSDUCER

[75] Inventors: Barry M. Newberg, Florissant; Lawrence J. Winkeler, Kirkwood, both of Mo.

[73] Assignee: Emerson Electric Co., St. Louis, Mo.

[21] Appl. No.: 724,690

[22] Filed: Oct. 1, 1996

[51] Int. Cl.⁶ .................. H02K 5/10; G01D 5/34
[52] U.S. Cl. .................. 310/68 B; 310/42; 403/254
[58] Field of Search .................. 403/254, 253, 403/256, 257, 247; 310/42, 68 B; 324/207.11; 250/231.13

[56] References Cited

U.S. PATENT DOCUMENTS

| | | | |
|---|---|---|---|
| 3,830,577 | 8/1974 | Rampe et al. | 403/378 |
| 4,005,347 | 1/1977 | Erdman | 318/254 |
| 4,259,603 | 3/1981 | Uchiyama et al. | 310/68 B |
| 4,375,592 | 3/1983 | Cox et al. | 250/231 |
| 4,386,270 | 5/1983 | Ezekiel | 250/231.13 |
| 4,543,704 | 10/1985 | Soussloff | 29/458 |
| 4,642,496 | 2/1987 | Kerviel et al. | 310/68 |
| 4,740,691 | 4/1988 | Ushiyama | 250/231.13 |
| 4,775,273 | 10/1988 | Bauer | 411/517 |
| 4,827,175 | 5/1989 | Kobayashi | 310/268 |
| 4,899,075 | 2/1990 | Hasabe | 310/257 |
| 4,933,636 | 6/1990 | McGee | 324/175 |
| 5,057,684 | 10/1991 | Service | 250/231.13 |
| 5,126,560 | 6/1992 | Kraus | 250/231.13 |
| 5,155,401 | 10/1992 | Kanaya et al. | 310/89 |
| 5,220,162 | 6/1993 | Umehara | 250/231.13 |
| 5,481,143 | 1/1996 | Burdick | 310/68 B |
| 5,565,721 | 10/1996 | Knappe | 310/68 B |

FOREIGN PATENT DOCUMENTS

| | | | |
|---|---|---|---|
| 0 583 212 A | 2/1994 | European Pat. Off. | F16D 1/08 |
| 0 734 936 A | 10/1996 | European Pat. Off. | B62D 1/18 |
| 2-021028 A | 1/1990 | Japan | H02K 7/00 |
| 01-90546 | 8/1991 | Japan | 310/68 B |

*Primary Examiner*—Thomas M. Dougherty
*Assistant Examiner*—B. Mullins
*Attorney, Agent, or Firm*—Arnold, White & Durkee

[57] ABSTRACT

An improved method and apparatus for aligning and mounting a rotor position transducer element to the shaft of an electric motor. One embodiment of the invention is is an apparatus and method for aligning and mounting a RPT element in the form of a shutter assembly. Specifically, the shutter contains a perforated extended portion that surrounds the opening for the shaft. An annular clamp ring, made of metal or other suitable material slip fits over the protruded portion of the shutter. The clamp ring can also further comprise so-called "ears" or other non-annular portions that cause it not to be circular in cross-section. The clamp ring allows the shutter to be securely fastened to the shaft of the rotor without causing torsional force which could cause misalignment of the shutter with respect to the optical sensor, or misalignment of the rotor to the stator assembly, or both.

20 Claims, 3 Drawing Sheets

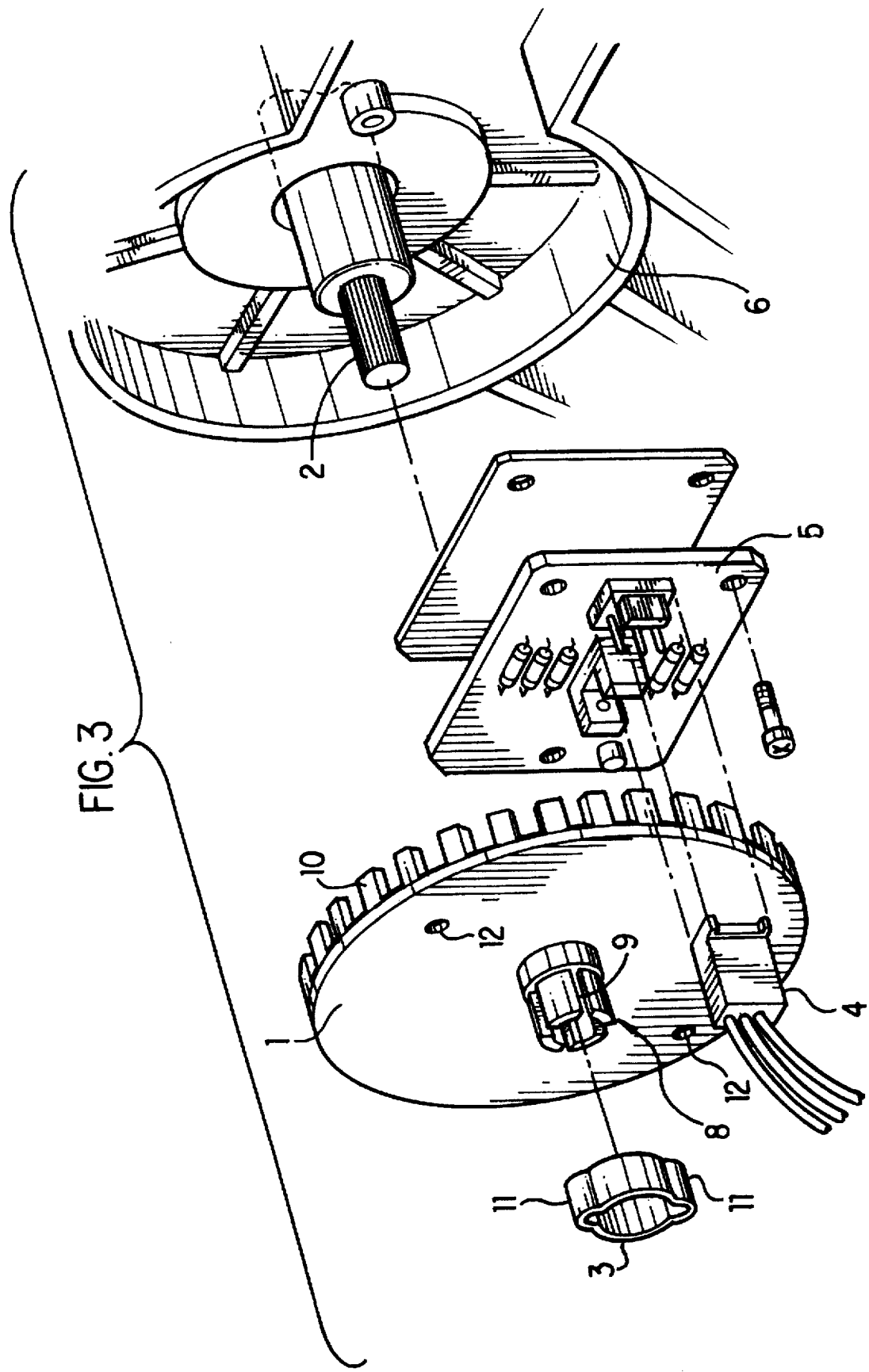

5,786,646

METHOD AND APPARATUS FOR ALIGNING A ROTOR POSITION TRANSDUCER

BACKGROUND OF THE INVENTION

1. Field of the Invention

This invention relates to a device for aligning and locating the position of a rotor position transducer element ("RPT element") in an electric motor. More specifically, the present invention relates to an improved method and apparatus for aligning and mounting a RPT element such as, for example, a shutter mechanism, with respect to the rotor of an electric motor.

2. Description of Related Art

In certain electric motor applications, knowing the location of the rotor in relation to the stator and windings is necessary, and in some motors, it is critical. For example, in switch reluctance motors, the windings must be energized based on a precise location of the rotor. In other motors, it is only necessary to know the location of the rotor in relation to the stator assembly.

There are several prior art RPT elements such as reluctance, capacitance and magnetic RPTs. In addition, it is known in the art that a shutter mechanism can work in conjunction with an optical sensor to provide an electrical signal to energize the different winding phases. A typical prior art method of installing a shutter onto an electric motor is that, first, a phase of the windings are energized to cause alignment of the rotor to the stator assembly. Next, a shutter is placed on the rotor shaft. It can be held on the shaft, usually through a press-fit, knurled, or other frictional-type assembly. Alternatively, it can be held by means of a fastening device, such as a split-ring with a screw adjustment or a tapered-sleeve that secures the shutter to the rotor shaft.

The above known prior art fastening devices cause problems in that, once the rotor is aligned, it is difficult to secure the RPT to the shaft without misaligning the rotor. That is, the forces required to secure the RPT to the rotor shaft causes either the RPT to move out of alignment or the rotor move out of its energized alignment, or both. The same problems can occur with respect to the shutter assembly. Typically, during assembly of the electric motor, one phase of the windings are energized to align the rotor. With the rotor in alignment, prior art shutters would be knurled or press-fit onto the shaft of the rotor. The force required to place the shutter on the shaft would misalign the shutter and/or rotor. Also, prior art means to secure the shutter to the shaft would typically be a screw clamp or tapered-sleeve fitting. Both means are cumbersome and typically cause torsional and rotational force to be applied to the shutter and shaft and, thus, cause misalignment of the shutter.

It is an object of the present invention to overcome the above-described problems in aligning and mounting RPT elements. For example, it is an object of the present invention to overcome the above-described problem by providing a shutter and fastening member that can firmly secure the shutter to the shaft easily and without affecting the alignment of the rotor.

SUMMARY OF THE INVENTION

In accordance with an exemplary embodiment of the present invention, a shutter assembly is provided that comprises a shutter and a clamp ring. The shutter contains a perforated extended portion that surrounds the opening for the shaft. The clamp ring is annular and can be made of metal or other suitable material. The clamp ring can also further comprise so-called "ears" or other non-annular portions that cause it not to be circular in cross-section. This assembly allows the shutter to be securely fastened to the shaft of the rotor without causing torsional force which could cause misalignment of the shutter with respect to the optical sensor, or misalignment of the rotor to the stator assembly, or both.

BRIEF DESCRIPTION OF THE DRAWINGS

FIG. 3 is an exploded view of an embodiment of the present invention.

Figure 1:
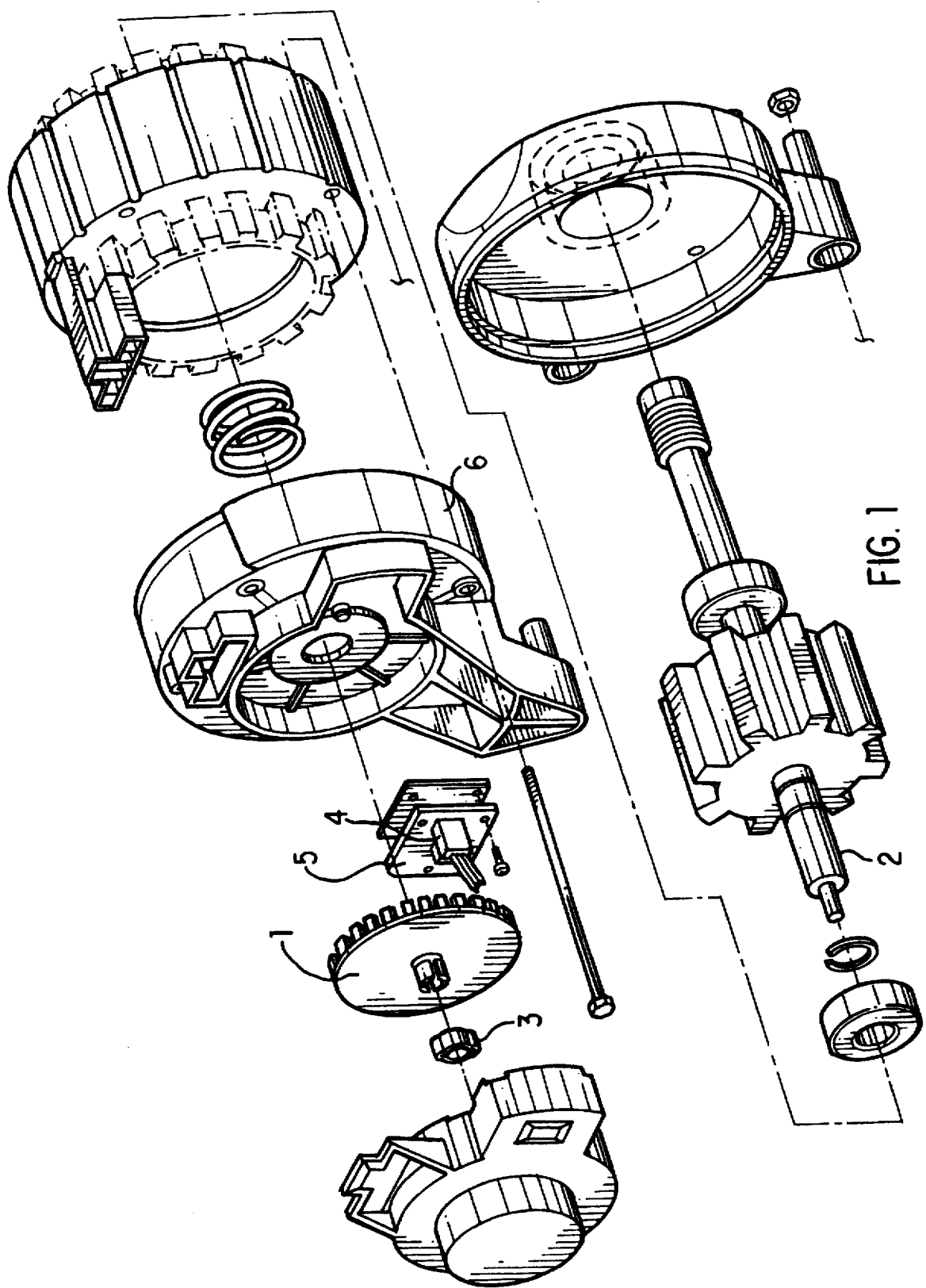
FIG. 1 is an exploded view of a switch reluctance motor showing the location and assembly of an embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DETAILED DESCRIPTION OF THE INVENTION

In certain electric motors, it is important to know the location of the rotor in relationship to the stator assembly. More particularly, in switch reluctance motors, windings are energized based on the location of the rotor. Thus, in switch reluctance motors, a precise relationship between the rotor and the stator is critical to its operation.

It is known in the art that one method of tracking the location of the rotor is through the use of a RPT element in the form of a shutter and optical sensor. The shutter is typically mounted on the shaft of the rotor and, thus, rotates with the shaft and rotor. The optical sensor is typically mounted to a printed circuit board which, in turn, is mounted to an endplate of the motor. In a preferred embodiment, the shutter is round and made of plastic with teeth extended from its outer edge at a 90° angle. The teeth are barcoded and, thus, as the shutter rotates, it provides a signal to the optical sensor. The optical sensor sends the signal through the printed circuit board which, in turn, controls the energization of the windings of the motor.

Figure 2:
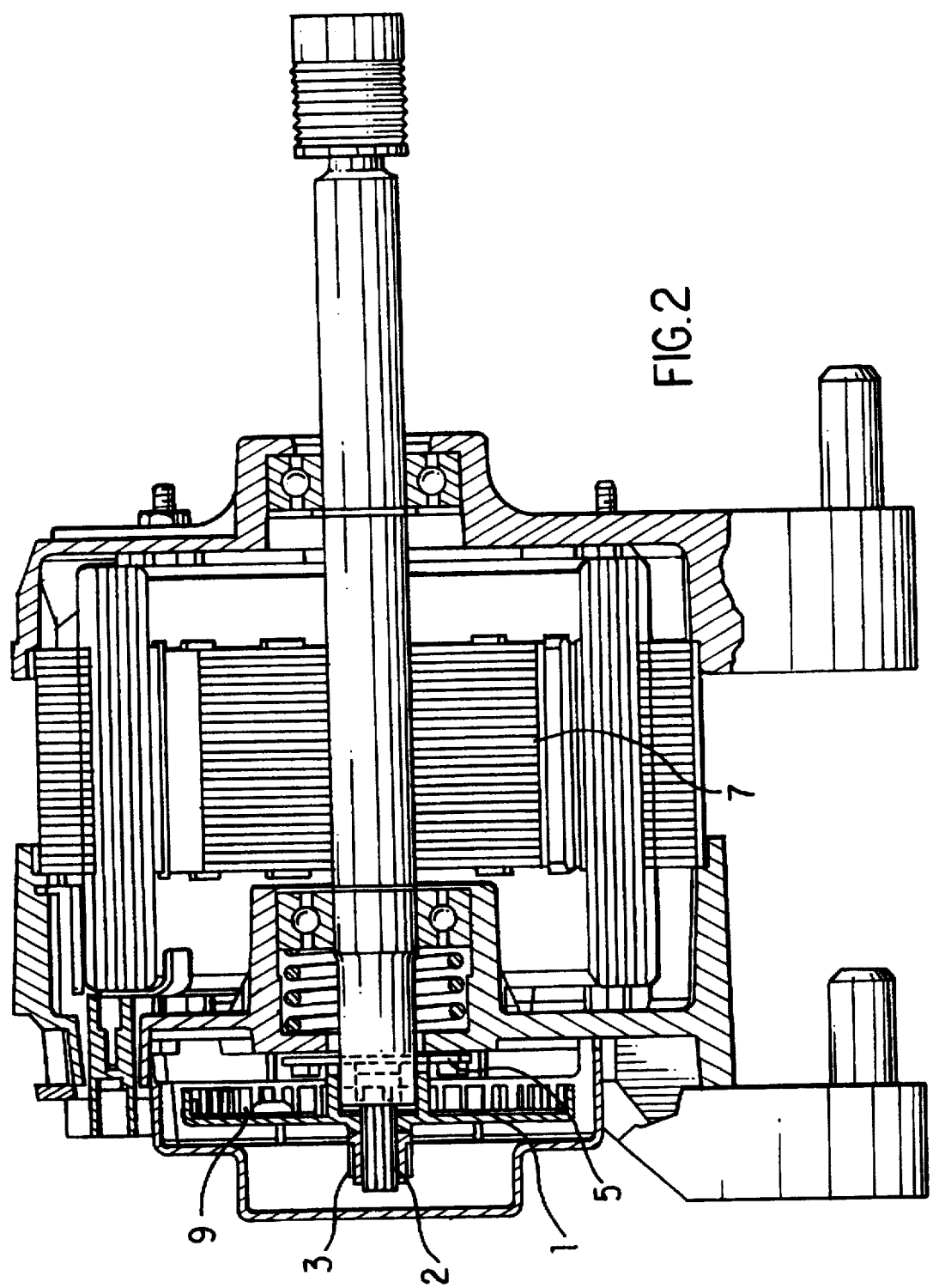
FIG. 2 is a cross-sectional view of a switch reluctance motor showing the location of an embodiment of the present invention.

FIG. 1 shows an exploded view of a switch reluctance motor containing an embodiment of the present invention. Shutter 1 is slip-fit over rotor shaft 2 and secured to shaft 2 by fastening member 3. An optical sensor 4 is attached to a printed circuit board 5 which, in turn, is attached to an endshield 6 of the motor. FIG. 2 is a cross-sectional view of a preferred embodiment of the present invention. In this view, shutter 1 is shown in spatial relationship to shaft 2 and stator assembly 7.

FIG. 3 is an exploded view of a preferred embodiment of the present invention. In this embodiment, shutter 1 is round and contains a protruded portion 8 with notches 9 perpendicular to the radial plane of shutter 1. The protruded portion 8 forms an opening that preferably slip-fits over rotor shaft 2. In the preferred embodiment, shutter 1 is made of a lightweight durable material, such as plastic. The optical sensor 4 is mounted to printed circuit board 5 which, in turn, is mounted to endshield 6 of the motor. Barcoded teeth 10 are provided at a 90° angle to the radial plane of shutter 1. As shutter 1 rotates with rotor shaft 2, the barcoded teeth 10 alternately interrupt the light beam of optical sensor 4 to cause the printed circuit board 5 to send a signal to a second printed circuit which, in turn, energizes the appropriate windings in the stator of the motor.

Also shown in FIG. 3, is the preferred embodiment of fastening member 3. In the preferred embodiment, fastening member 3 is a metal annular or ring-like structure made out of a compliant and somewhat nonelastic material, such as aluminum or steel. In a most preferred embodiment, fastening member 3 is steel and has ears 11. The ears 11 are oppositely opposed from one another to provide balance during rotation. The ears 11 also facilitate the clamping or tightening of fastening member 3. The preferred embodiment of fastening member 3 is manufactured by OETIKER™.

In the preferred embodiment, shutter 1 slip-fits onto shaft 2 of the rotor of a motor. Fastening member 3 slips-fits over protruded portion 8 of shutter 1. Once the shutter 1 is properly aligned, fastening member 3 can be easily clamped, or compressed in the radial direction to firmly secure shutter 1 to shaft 2 without causing substantial torsional or rotational force to either shutter 1 or shaft 2. The clamping action used to compress fastening member 3 is less cumbersome than prior art devices and readily secures shutter 1 to shaft 2 without causing torsional or rotational force that could misalign the rotor or shutter 1.

In operation, it is appreciated that fastening member 3 should be lightweight and balanced. It can also be appreciated that the heavier the material of fastening member 3, the more that it should be balanced. It can also be appreciated that ears 11 are not required for proper operation. Additionally, the number and shape of ears 11 can vary within the scope of the invention. Also, the structure of the area of the shutter that provides the opening for the shaft (e.g., protruded portion 8) can be varied within the scope of the invention. In the preferred embodiment, the various parts of shutter 1, including the protruded portion 8 and teeth 9 are integrally molded in plastic as one piece.

The assembly of the present invention can be accomplished either manually, by automation or a combination of both. An automated process provides faster results and can be integrated into an assembly line.

In a preferred method, a motor is clamped or fixed in place. A current (40 vdc; 4±0.5 A) is applied to phase A of the windings to align rotor and stator. The shaft 2 is clamped or fixed in place. The current is then removed. Shutter 1 is slip-fit onto shaft 2 and shutter position referencing holes 12 are used to align shutter 1 to sensor 4. The shutter 1 is slipped axially down shaft 2 until shutter 1 is 0.070±0.030 from bottom of sensor 4. The sensor 4 is then energized (5V, 20 ma). The shutter 1 is rotated counterclockwise until sensor 4 is triggered (±0° 10'). Fastening member 3 is then slipped over protruded portion 8 of shutter 1, and then clamped or compressed to lock shutter 1 in place to shaft 2 without substantial torsional or rotational force. The ears 11 should be compressed equally to cause fastening member 3 to operate in a balanced manner.

It can be appreciated that the individual steps, as well as the sequence thereof, of (1) energizing a phase of the windings; (2) slip-fitting a shutter onto the shaft of the rotor; (3) slip-fitting a fastening member over a portion of the shutter; (4) aligning the shutter in position with an optical sensing device; and (5) clamping or compressing the fastening member such that the shutter is secured firmly onto the rotor shaft without substantial rotational or torsional force being applied to the rotor or the shutter, can be altered without departing from the scope of the invention.

Moreover, the above description of the exemplary embodiments of the device and method are by way of example and not for purposes of limitation. Many variations may be made to the embodiments and methods disclosed herein without departing from the scope and spirit of the present invention. Specifically, the present invention may be used in conjunction with RPT elements such as reluctance, capacitance and magnetic RPT elements.

What is claimed is:

1. A rotor position transducer assembly comprising:
   a RPT element adapted to be mounted on the shaft of a rotor, said RPT element having a protruded portion; and
   a fastening member adapted to be slip-fit over said shaft and said protruded portion of said RPT element, said fastening member being compressed about said protruded portion so as to secure said RPT element to said shaft without causing torsional force to be applied to said shaft or said RPT element to cause misalignment of said shaft or said RPT element.

2. The rotor position transducer assembly of claim 1 wherein the RPT element is a shutter assembly adapted to be mounted on said shaft of said rotor.

3. The shutter assembly of claim 2 wherein said fastening member further comprises an annular ring.

4. The shutter assembly of claim 3 wherein said fastening member further comprises an annular ring with balancing ears.

5. The shutter assembly of claim 4 wherein said fastening member further comprises a metal annular ring with balancing ears.

6. The rotor position transducer assembly of claim 1 wherein the RPT element is adapted to be slip-fit over the shaft.

7. A shutter assembly for an electric motor comprising:
   a shutter adapted to be mounted on the shaft of a rotor, said shutter having a protruded portion adapted to be slip-fit onto the shaft of said rotor; and
   a fastening member adapted to be slip-fit over said shaft and said protruded portion of said shutter, said fastening member adapted to be compressed about said protruded portion to secure said protruded portion of said shutter to said shaft without the application of torsional force sufficient to cause misalignment of said shaft or said shutter.

8. The shutter assembly of claim 7 wherein said fastening member further comprises an annular ring.

9. The shutter assembly of claim 8 wherein said fastening member further comprises an annular ring with balancing ears.

10. The shutter assembly of claim 9 wherein said fastening member is a metal annular ring with balancing ears.

11. A shutter assembly for an electric motor comprising:
    a shutter having a protruded portion adapted to be slip-fit onto a rotor shaft; and means for fastening said protruded portion of said shutter to said shaft without causing substantial torsional force to be applied to said shaft or said shutter as to cause misalignment of said shutter or said rotor shaft; wherein said means for fastening comprises a metal annular fastening member with ears.

12. The shutter assembly of claim 11 wherein said protruded portion of said shutter is notched.

13. The shutter assembly of claim 12 wherein said shutter is further comprised of molded plastic.

14. A method of securing a shutter to the shaft of a rotor of an electric motor comprising the steps of:

energizing a phase of the windings to align the rotor into position;

slip-fitting a shutter onto the shaft of said rotor;

aligning said shutter in position with an optical sensing device; and a step for securing said shutter firmly onto said shaft without causing substantial torsional force to be applied to said shutter or said shaft so as to cause misalignment of said shutter or said shaft.

15. A rotor position transducer assembly comprising:

a RPT element adapted to be mounted onto a rotor shaft of an electric motor, said RPT having a protruded portion;

a fastening member, said fastening member having a slip-fit relationship with respect to said rotor shaft and said protruded portion of said RPT element, said fastening member being compressed about said protruded portion such that the fastening member is capable of securing said RPT element to said shaft without causing substantial torsional force to said RPT element or said rotor shaft so as to cause misalignment of said RPT element or said rotor shaft.

16. The rotor position transducer assembly of claim 15 wherein said RPT element is a shutter.

17. The rotor position transducer assembly of claim 15 wherein the RPT element is adapted to have a slip-fit relationship with respect to said rotor shaft.

18. A method of securing a shutter to the shaft of a rotor of an electric motor comprising the steps of:

energizing a phase of the windings to align the rotor into position;

slip-fitting a shutter onto the shaft of said rotor;

slip-fitting a fastening member over a portion of said shutter;

aligning said shutter in position with an optical sensing device; and compressing said fastening member about said portion to secure the shutter onto the shaft.

19. The method of claim 18 wherein the compressing step comprises compressing a pair of ears protruding from the fastening member.

20. The method of claim 18 wherein the second slip-fitting step comprises slip-fitting the fastening member over a notched, protruded portion of said shutter.

* * * * *